United States Patent
Sano

(10) Patent No.: US 11,006,070 B2
(45) Date of Patent: May 11, 2021

(54) DISPLAY DEVICE AND VIDEO DISPLAY METHOD THEREFOR

(71) Applicant: NEC Display Solutions, Ltd., Tokyo (JP)

(72) Inventor: Keita Sano, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/348,537

(22) PCT Filed: Nov. 11, 2016

(86) PCT No.: PCT/JP2016/083509
§ 371 (c)(1),
(2) Date: May 9, 2019

(87) PCT Pub. No.: WO2018/087881
PCT Pub. Date: May 17, 2018

(65) Prior Publication Data
US 2020/0059627 A1    Feb. 20, 2020

(51) Int. Cl.
*H04N 7/08*    (2006.01)
*H04N 5/44*    (2011.01)
*H04N 7/10*    (2006.01)
*H04N 21/4363*    (2011.01)

(52) U.S. Cl.
CPC ............. *H04N 7/0806* (2013.01); *H04N 5/44* (2013.01); *H04N 7/10* (2013.01); *H04N 21/43635* (2013.01)

(58) Field of Classification Search
None
See application file for complete search history.

(56) References Cited

U.S. PATENT DOCUMENTS

| | | | |
|---|---|---|---|
| 2003/0079036 A1* | 4/2003 | Terada | H04H 60/04 709/231 |
| 2006/0107294 A1* | 5/2006 | Rivlin | G11B 27/031 725/80 |
| 2009/0109338 A1* | 4/2009 | Furutani | H04N 21/4858 348/565 |
| 2010/0090849 A1* | 4/2010 | Suga | H04N 21/43635 340/653 |

FOREIGN PATENT DOCUMENTS

| | | |
|---|---|---|
| JP | 2002-209159 A | 7/2002 |
| JP | 2013-078089 A | 7/2002 |
| JP | 2012-109779 A | 6/2012 |
| JP | 2013-207652 A | 10/2013 |
| JP | 2014-092617 A | 5/2014 |

OTHER PUBLICATIONS

International Search Report (ISR) (PCT Form PCT/ISA/210), in PCT/JP2016/083509, dated Jan. 24, 2017, and English Translation thereof.

* cited by examiner

*Primary Examiner* — Samira Monshi
(74) *Attorney, Agent, or Firm* — McGinn I.P. Law Group, PLLC.

(57) ABSTRACT

A display device is connectible to a first video signal output device and a second video signal output device. Upon receiving an input switch instruction from the first video signal output device, the display device is configured to inhibit a first video from the first video signal output device from being displayed when displaying a second video from the second video signal output device.

16 Claims, 6 Drawing Sheets

| COOPERATIVE DEVICE NUMBER | P. A | DEVICE TYPE | STATUS |
|---|---|---|---|
| 1 | [0. 0. 0. 0] | DISPLAY DEVICE 10 | . . . |
| 2 | [1. 0. 0. 0] | VIDEO SIGNAL OUTPUT DEVICE 20_1 | INACTIVE DEVICE |
| 3 | [2. 0. 0. 0] | VIDEO SIGNAL OUTPUT DEVICE 20_2 | ACTIVE DEVICE |
| 4 | (None) | (None) | . . . |
| . . . | . . . | . . . | . . . |

FIG. 5

| COOPERATIVE DEVICE NUMBER | P.A | DEVICE TYPE | STATUS |
|---|---|---|---|
| 1 | [0.0.0.0] | DISPLAY DEVICE 10 | ... |
| 2 | [1.0.0.0] | VIDEO SIGNAL OUTPUT DEVICE 20_1 | SEMIACTIVE DEVICE |
| 3 | [2.0.0.0] | VIDEO SIGNAL OUTPUT DEVICE 20_2 | ACTIVE DEVICE |
| 4 | (None) | (None) | ... |
| ... | ... | ... | ... |

DISPLAY DEVICE AND VIDEO DISPLAY METHOD THEREFOR

TECHNICAL FIELD

The present invention relates to a display device and a video display method of a display device.

BACKGROUND ART

It becomes mainstream that multiple video signal output devices having digital broadcasting receiving functions such as DVD players and personal computers (PC) are digitally connected to display devices configured to display videos corresponding to video signals supplied from multiple video signal output devices through cables according to HDMI (High Definition Multimedia Interface: Trademark Registration) standards (hereinafter, referred to as HDMI cables).

The HDMI has a CEC (Consumer Electronics Control) function enabling cooperation with peripheral devices. For example, CEC standards include a one-touch play function. According to the one-touch play function, a display device connected to multiple video signal output devices through HDMI cables may turn on its power if its power is off when any one of video signal output devices is activated by its playback button being pressed. When the display device inputs a different video signal than a video signal from the video signal output device which is activated, the display device changes its video signal input thereto to the video signal from the activated video signal output device.

The one-touch play function allows a user to simply press a playback button of a video signal output device, thus displaying a video from the video signal output device with its playback button being pressed. To display a video on the display device, for example, the user does not need to power on the display device using a remote control or to change a video signal input to the display device; hence, it is possible to display a video with a simple operation.

Patent Document 1 discloses an AV device able to suppress power consumption when multiple video signal output devices (e.g. AV devices) are connected to a display device with HDMI cables. When the display device displays a video of a video signal from one AV device, another AV device is activated so that a video signal of a video to be displayed on the display device is changed with another video signal from another video signal output device according to a one-touch play function, wherein it is possible to suppress power consumption since one AV device reduces its power consumption.

Patent Document 2 discloses a display device incorporating a video signal output device (or a device) such as a TV tuner, wherein it is assumed that an information device may compete with a display device in terms of device use when the display device and the information device connected to the display device are able to concurrently use the same device. Due to conflicts in device use, the display device allows a user to determine whether or not to select the display device or the information device in an attempt to use a device lately rather than the display device or the information device having used a device previously upon detecting the operating condition of the device.

CITATION LIST

Patent Document

Patent Document 1: Japanese Patent Application Publication No. 2012-109779

Patent Document 2: Japanese Patent Application Publication No. 2002-209159

SUMMARY OF INVENTION

Technical Problem

Any display devices compatible with one-touch play functions, such as the display device disclosed in Patent Document 1, may compulsorily display AV signals supplied from other AV devices, which may be turned on lately, irrespective of other videos being currently displayed. This may cause a video currently displayed to be changed with another video, but this may be inconvenient for a user to watch the currently-displayed video.

In the display device of Patent Document 2, a user needs to select either the information device or the display device to use a device; hence, it takes time and labor.

The present invention is made in consideration of the aforementioned circumstances. The present invention aims to provide a display device configured to unconditionally prevent a video from being displayed in an attempt to display a video of a video signal from a video signal output device which is activated although a video of a video signal from another video signal output device is currently displayed.

Solution to Problem

To solve the above problem, the present invention is directed to a display device configured to display a video of a video signal supplied from a video signal output device. Upon receiving an input switch instruction from a first video signal output device, the display device is configured to inhibit a video of a video signal of the first video signal output device from being displayed when displaying a video of a video signal supplied from a second video signal output device.

In addition, the present invention is directed to a video display method of a display device including the steps of: receiving an input switch instruction from a first video signal output device; determining whether or not a video of a video signal supplied from the second video signal output device is being displayed; and inhibiting a video of a video signal of the first video signal output device from being displayed when the video of the video signal supplied from the second video signal output device is being displayed.

Advantageous Effects of Invention

It is possible to unconditionally inhibit a video from being displayed when a video of a video signal from another video signal output device is currently displayed on screen in an attempt to display a video of a video signal from a video signal output device which starts outputting its video signal.

BRIEF DESCRIPTION OF DRAWINGS

FIG. 5 shows another example of the active device management table used for the processing of the display device of FIG. 1 different from that of FIG. 2.

DESCRIPTION OF EMBODIMENTS

Hereinafter, a display device according to the embodiment of the present invention will be described with reference to the drawings.

First Embodiment

First, the first embodiment will be described below.

Figures 1, 2:
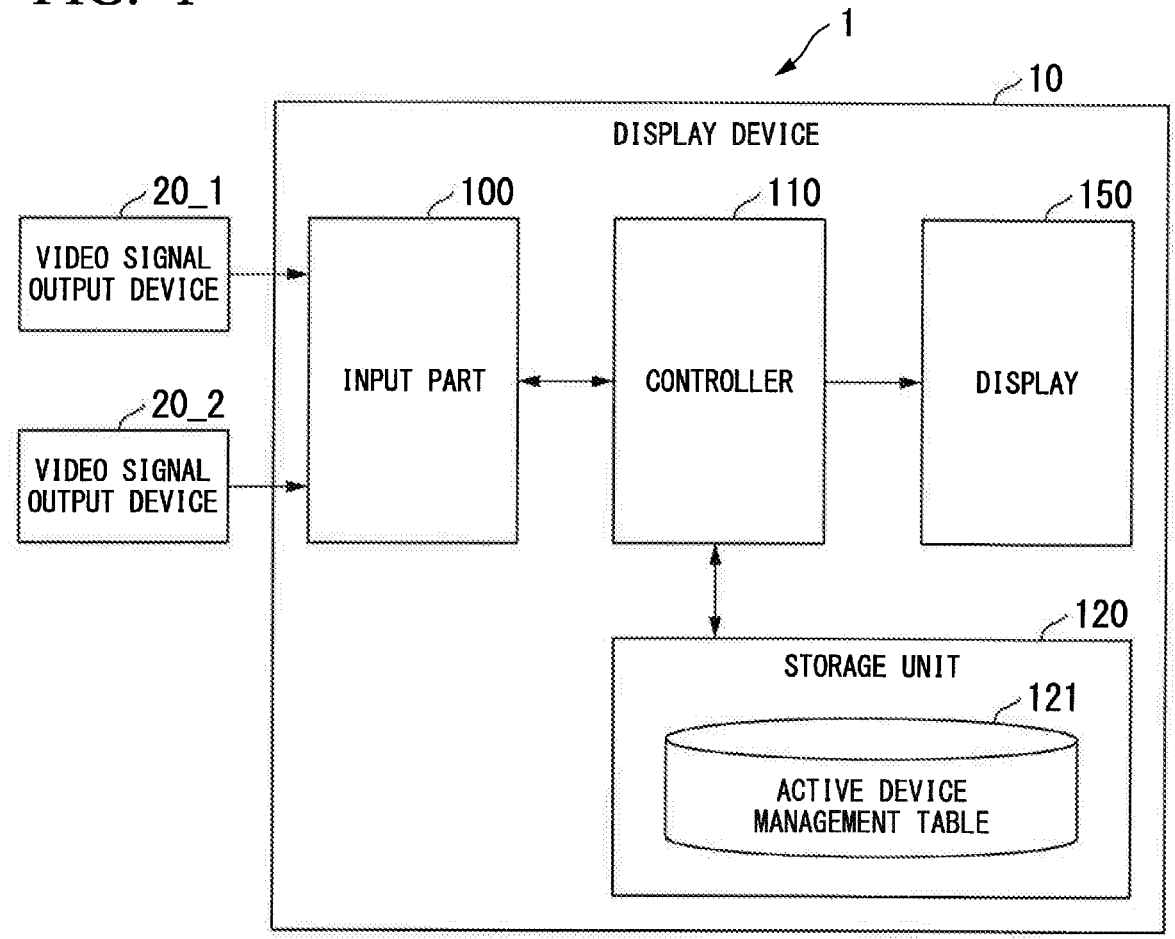
FIG. 1 is a functional block diagram showing a configuration example of a display system including a display device according to the first embodiment.
FIG. 2 shows an example of an active device management table used for the processing of the display device of FIG. 1.

FIG. 1 is a functional block diagram showing a configuration example of a display system including a display device according to the first embodiment. As shown in FIG. 1, a display system 1 includes a display device 10 and a plurality of video signal output devices 20_1, 20_2 (hereinafter, collectively referred to as video signal output devices 20). FIG. 1 shows two video signal output devices 20 connected to the display device 10; however, it is possible to connect two or more video signal output devices 20 to the display device 10.

The video signal output devices 20_1, 20_2 outputs video signals to the display device 10. The display device 10 inputs video signals output from the video signal output devices 20_1, 20_2 and thereby displays a video corresponding to either a video signal of the video signal output device 20_1 or the video signal of the video signal output device 20_2.

The display device 10 determines to display a video corresponding to either a video signal of the video signal output device 20_1 or a video signal of the video signal output device 20_2 based on control signals which the video signal output devices 20_1, 20_2 output to the display device 10.

When the video signal output device 20_1 is activated to start outputting its video signal, for example, the video signal output device 20_1 sends a control signal indicating a start to output its video signal to the display device 20.

Upon receiving the control signal indicating that the video signal output device 20_1 starts outputting its video signal, the display device 10 displays a video corresponding to the video signal from the video signal output device 20_1 based on the control signal.

Although the video signal output device 20_1 sends a control signal indicating a start of outputting its video signal to the display device 10, the display device 10 may display a video signal from the video signal output device 20_2. In this case, the display device 10 may recognize a control signal indicating that the video signal output device 20_1 starts outputting its video signal as a control signal (or an input switch instruction) instructing a switch from a video signal of the video signal output device 20_2 currently input to the display device 10 to a video signal of the video signal output device 20_1.

Upon receiving the input switch instruction from the video signal output device 20_1, the display device 10 does not display a video corresponding to a video signal of the video signal output device 20_1 when the display device 10 currently displays a video corresponding to a video signal of the video signal output device 20_2.

Upon receiving the input switch instruction from the video signal output device 20_1, the display device 10 acquires an active state of the video signal output device 20_2 when the display device 10 currently displays a video corresponding to a video signal of the video signal output device 20_2, and then, the display device 10 starts displaying a video corresponding to a video signal of the video signal output device 20_1 when the video signal output device 20_2 is changed to an inactive state.

The inactive state of the video signal output device 20_2 may be at least one of a non-power status indicating no power applied to the video signal output device 20_2, a non-signal state indicating no video signal output from the video signal output device 20_2, and a non-playback state indicating suspension of video playback with the video signal output device 20_2.

When the display device 10 is connected to the video signal output device 20 through a HDMI cable, for example, a control signal transmitted between the video signal output device 20 and the display device 10 would correspond to the CEC (Consumer Electronics Control) of the HDMI cable. In other words, the HDMI cable includes multiple signal lines used to transmit video signals and a signal line used to transmit a CEC command. The CEC of the HDMI cable may stipulate a CEC command used to acquire a power status or the like other than a CEC command indicating a start of outputting a video signal. The video signal output device 20 or the display device 10 may transmit a control signal to another video signal output device 20 or the like by transmitting the CEC commands.

For example, the display device 10 may be a liquid crystal display, an organic EL (Electro-Luminescence) display, a projector, or a television set without limiting its type.

For example, the display device 10 includes an input part 110, a controller 110, a storage unit 120, and a display 150. The input part 100 and the controller 110 may be embodied by a processor such as a CPU (Central Processing Unit) upon executing programs stored on program memory. In this connection, part of functional parts or the entirety of functional parts may be embodied using hardware such as LSI (Large Scale Integration), ASIC (Application-Specific Integrated Circuit), or FPGA (Field-Programmable Gate Array).

The input part 100 receives video signals and control signals from the multiple video signal output devices 20. The input part 100 inputs video signals and control signals from the video signal output devices 20 and thereby outputs those signals to the controller 110. The controller 110 receives video signals and control signals, which are input to the input part 100 together with video signals, from the input part 100. The controller 110 determines whether to display any one of videos of video signals output from the multiple video signal output devices 20 according to control signals with reference to an active device management table 121 stored on the storage unit 120. In this connection, a method how to select video signals by the controller 110 will be described later.

The storage unit may be embodied using ROM (Read-Only Memory), RAM (Random-Access Memory), HDD (Hard-Disk Drive), flash memory or the like. The storage unit 120 stores the active device management table 121. The active device management table 121 will be discussed later.

The display 150 inputs a video signal from the video signal output device 20, which is selected by the controller 110, and thereby displays a video corresponding to the video signal input thereto.

For example, the video signal output device 20 may be a television tuner, a hard-disk recorder, a DVD (Digital Versatile Disk) player, and a blue-disk (trademark registration) player, a PC, a mobile terminal, or the like. When a user presses a playback button to start the operation of the video signal output device 20, a video signal is generated by pressing the playback button and then transmitted to the display device 10 together with a control signal.

The active device management table 121 will be described with reference to FIG. 2. FIG. 2 shows an example of the active device management table 121. Herein, the active device corresponds to the video signal output device 20 which supplies a video signal representing a video to be displayed on the display device 10.

The active device management table 121 has various columns such as "cooperative device number", "P.A", "device type", and "status". The column of "cooperative device number" is used to register the numbers assigned to the video signal output devices connected through HDMI cables. The column "P.A" is used to register physical addresses (P.A) representing the connected positions of the video signal output devices connected through HDMI cables. The column of "device type" is used to register device types such as a video displaying device (e.g. a display device) and a video-signal supplying device (e.g. a video signal output device). The column "status" is used to register the statuses of devices connected through HDMI cables as to whether they are active devices or not.

Physical addresses will be described below. The physical address is a device identification using a 16-bit numerical value, which is divided into four sections in units of four bits. FIG. 2 shows an example in which the physical address [0.0.0.0] is allocated to the display device 10. In addition, the physical address [1.0.0.0] is allocated to the video signal output device 20_1 while the physical address [2.0.0.0] is allocated to the video signal output device 20_2 connected to the display device 10.

The physical addresses of devices such as the video signal output devices 20, which are connected through HDMI cables so as to output control signals, are added to control signals input to the controller 110. The controller 110 is configured to determine which video signal output device 20 may output a control signal with reference to the physical address added to the control signal input thereto.

The controller 110 selects the video signal output device 20 configured to output a video signal displayed on the display 150 based on the content of the control signal with reference to the physical address added to the control signal input thereto. The controller 110 outputs a video of a video signal of the selected video signal output device 20 to the display 150.

To the video signal output device 20 configured to output a video signal displayed on the display 150, the controller 110 updates the active device management table 121. The controller 110 writes the information representing "active device" into the active device management table 121 in the column "status" relating to the video signal output device 20 configured to output a video signal displayed on the display 150. In addition, the controller 110 writes the information representing "inactive device" in the column "status" relating to the video signal output device 20 configured to output a video signal displayed on the display 150.

FIG. 2 shows an example of the active device management table 121 in which the information representing "inactive device" is written into the active device management table 121 in the column "status" relating to the video signal output device 20_1. In addition, the information representing "active device" is written into the column "status" relating to the video signal output device 20_2. The example of FIG. 2 shows that the display device 10 inhibits a video signal of the video signal output device 20_1 from being displayed thereon. In addition, it shows that the display device 10 displays a video signal of the video signal output device 20_2.

Figure 3:
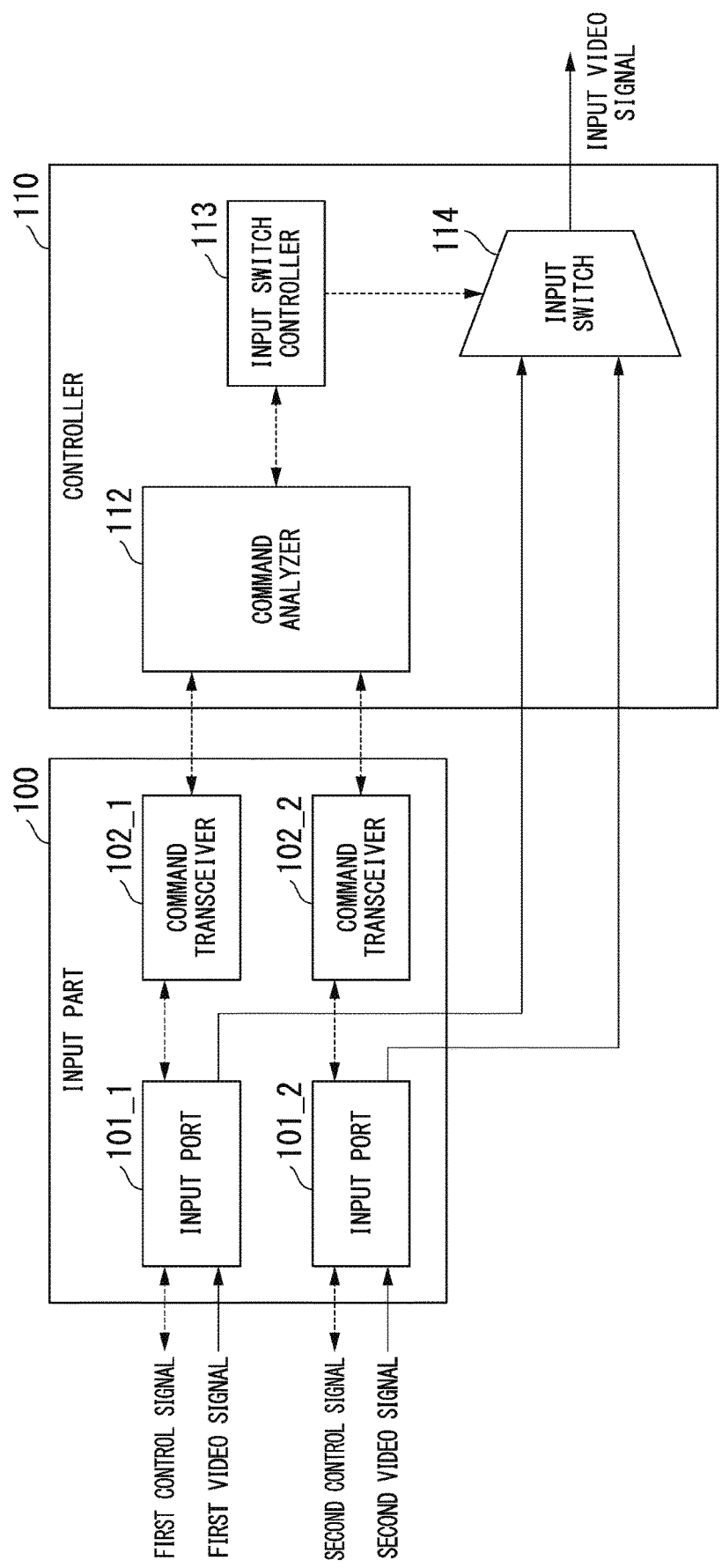
FIG. 3 is a functional block diagram showing the configuration of a controller of the display device of FIG. 1.

FIG. 3 is a functional block diagram showing the configuration of the input part 100 and the configuration of the controller 110. As shown in FIG. 3, for example, the input part 100 includes input ports 101_1, 101_2 (hereinafter, collectively referred to as input ports 101) and command transceivers 102_1, 102_2 (hereinafter, collectively referred to as command transceivers 102) connected to input parts 101_1, 101_2.

The input port 101_1 inputs a first video signal and a first control signal from the video signal output device 20_1. The input port 101_1 outputs the first video signal to an input switch 114. The input port 101_2 inputs a second video signal and a second control signal from the video signal output device 20_2. The input port 101_2 outputs the second video signal to the input switch 114.

According to a control signal from an input switch controller 113, the input switch 114 selectively outputs either the first video signal input to the input port 101_1 or the second video signal input to the input port 101_2 as an input video signal to be input to the display 150.

The input port 101 outputs a control signal, which is input thereto from the video signal output device 20, to the command transceiver 102. Herein, the control signal input to the input port 101 from the video signal output device 20 is a control signal notified by the video signal output device 20, e.g. a notification command indicating a start of outputting a video signal from the video signal output device 20.

The input port 101 inputs a control signal from the command transceiver 102. Herein, the control signal input to the video signal output device 20 from the command transceiver 102 is a control signal notified by the display device 10, e.g. a notification command notifying to acquire a power status of the video signal output device 20. The input port 101 outputs the control signal from the command transceiver 102 to the video signal output device 20.

The command transceiver 102 inputs the control signal from the input port 101 and thereby outputs the control signal to a command analyzer 112 of the controller 110. The command transceiver 102 outputs the control signal, which is sent to the video signal output device 20 from the display device 10, to the input port 101.

For example, the controller 110 includes the command analyzer 112, the input switch controller 113, and the input switch 114. The command transceiver 112 inputs the control information from the command transceiver 102. The command transceiver 112 analyzes the control information input thereto and then outputs the analysis result to the input switch controller 113. When the control signal includes an output start notice, for example, the command analyzer 112 determines that a user makes a one-touch play operation, thus outputting to the input switch controller 113 a signal for switching a video signal output to the display 150 together with the physical address added to the control signal.

The command analyzer 112 generates a control signal, which is sent to the video signal output device 20 from the display device 10, according to an instruction of the input switch controller 113. When the input switch controller 113 sends an instruction to confirm a power status of the video signal output device 20, for example, the command analyzer 112 generates a notification command to confirm the power status of the video signal output device 20. The command analyzer 112 generates and outputs a control signal to the command transceiver 102.

The input switch controller 113 inputs from the command analyzer 112 the result of analyzing the control information. In addition, the input switch controller 113 controls the input switch 114 based on the analysis result of the control information and the information stored on the active device management table 121. In this connection, the processing of the input switch controller 113 for controlling the input switch 114 will be discussed later.

The input switch 114 inputs video signals from the multiple input ports 101. The input switch 114 outputs to the display device 150 a video corresponding to any one of video signals input thereto from the multiple input ports 101 according to the control signal from the input switch controller 113.

Figure 4:
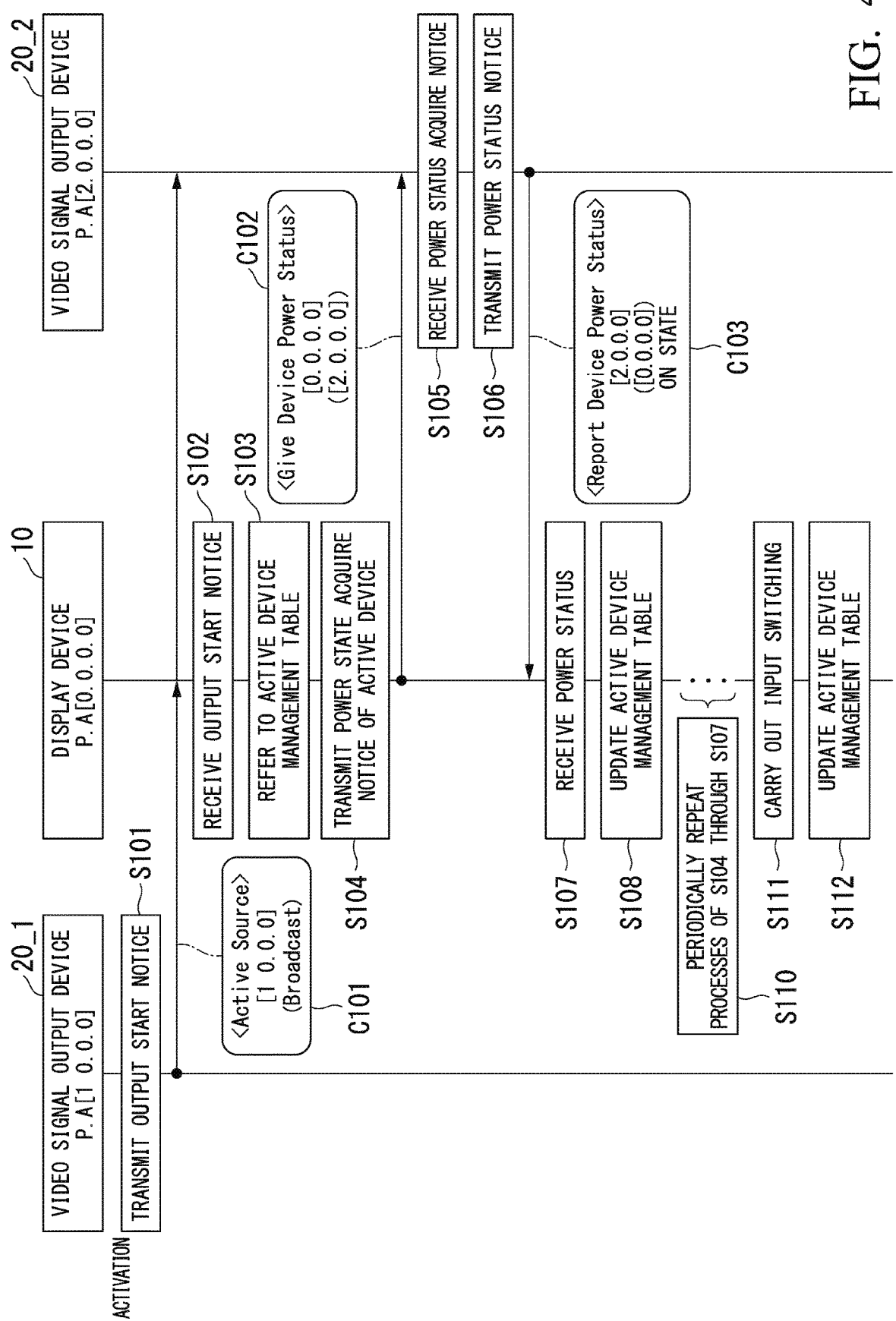
FIG. 4 shows an example of a flowchart showing processes conducted between video signal output devices and the display device shown in FIG. 1.

To display a video corresponding to a video signal from the video signal output device 20_1 on the display device 10, it is necessary to transfer control signals between the display device 10 and the video signal output devices 20; hence, the control signals will be described with reference to FIG. 4. FIG. 4 is a flowchart showing control signals to be transferred between the display device 10 and the video signal output devices 20.

A precondition is made such that the video signal output device 20_1 is activated while the display device 10 currently displays a video corresponding to a video signal supplied from the video signal output device 20_2, and therefore the video signal output device 20_1 starts to output a video signal.

In addition, it is assumed that the active device management table 121 has stored the information shown in FIG. 2. That is, the active device management table 121 has stored the physical addresses [0.0.0.0], [1.0.0.0], [2.0.0.0] for the display device 10, the video signal output device 20_1, and the video signal output device 20_2 respectively, wherein the video signal output device 20_1 is an inactive device while the video signal output device 20_2 is an active device.

In addition, the control signals transferred between the display device 10 and the video signal output devices 20 are notification commands C101 through C103 shown in FIG. 4. Each of the notification commands C101 through C103 shown in FIG. 4 may include the information representative of a notification type, the information representative of a physical address of a notification source, the information representative of a physical address of a notification destination, and the information representing a status or the like.

When activated by pressing playback button, the video signal output device 20_1 notifies the display device 10 and the video signal output device 20_2 of the notification command C101 having an output start sign (step S101). The notification command C101 having an output start sign may include an output start notice <Active Source> as the information representing the type of notification, the physical address [1.0.0.0] of the video signal output device 20_1 as the information representing the physical address of a notification source, a general term of physical addresses, allocated to all the devices connected through HDMI cables, (Broadcast) as the information representing the physical address of a notification destination.

The display device 10 and the video signal output device 20_2 receives the notification command C101 from the video signal output device 20_1 (step S102). Upon receiving the notification command C101 having an output start sign, the display device 10 starts a process to display a video corresponding to a video signal from the video signal output device 20_1 indicated by the physical address [1.0.0.0] added to the notification command C101 according to the one-touch play function.

To start the process to display a video of a video signal from the video signal output device 20_1, the display device 10 acquires the physical address of an active device stored on the active device management table 121 with reference to the active device management table 121 (S103).

When the physical address of the active device acquired from the active device management table 121 differs from the physical address [1.0.0.0] representing the video signal output device 20_1, the display device 10 transmits to the video signal output device 20 (i.e. the video signal output device 20_2) indicated by the physical address of the active device a notification command C102 to acquire a power status (S104).

The notification command C102 used to acquire a power status includes various types of information such as a power status acquire sign <Give Device Power Status>, the physical address [0.0.0.0] of the display device 10 as a notification source, the physical address [2.0.0.0] of the video signal output device 20_2 as a notification destination.

The video signal output device 20_2 receives the notification command C102 from the display device (step S105). The video signal output device 20_2 transmits to the display device 10 a notification command C103 to notify its power status as a response to the notification command C102 (step S106).

The notification command C103 used to notify a power status includes various types of information such as a power status acquire sign <Report Device Power Status>, the physical address [2.0.0.0] of the video signal output device 20_2 as a notification source, the physical address [0.0.0.0] of the display device 10 as a notification destination, and the information representing an "ON state" as a power status.

The display device 10 receives the notification command C103 from the video signal output device 10 (step S107). The display device 10 acquires the power status of the video signal output device 20_2 (i.e. an active device) based on the notification command C103. When the power status of the active device is set to an ON state, the display device 10 temporarily holds the notification command 101 from the video signal output device 20_1 (step S108).

The case of step S108 for temporarily holding the notification command C101 from the video signal output device 20_1 will be described with reference to FIG. 5. FIG. 5 shows another example of the active device management table 121 than that of FIG. 2.

As shown in FIG. 5, in order to temporarily hold the notification command C101, the display device 10 refers to the active device management table 121 to thereby write the information representing "semiactive device" into the column "status" relating to the physical address [1.0.0.0] added to the notification command C101. Herein, the "semiactive device" can be defined as one video signal output device 20 configured to supply a video signal representing a video displayed on the display device 10 after another video signal output device 20 configured to supply a video signal representing another video displayed on the display device is turned off.

Referring back to FIG. 4, the display device carries out a series of steps S104 through S107 after a lapse of a predetermined time (e.g. one second) when the power status of the active device is set to an ON state. The display device 10 periodically repeats a series of steps S104 through S107 in each interval of time (e.g. every second interval) as long as the power status of the active device is set to an ON state. When the display device 10 receives the notification command C103, indicating an OFF state as the power status of the active device, in step S107, the display device 10 switches a video signal output to the display 150 from a video signal of the video signal output device 20_2 to a video signal of the video signal output device 20_1 according to an output start notice from a semiactive device (i.e. the video signal output device 20_1), and therefore the display device 10 displays a video corresponding to the video signal supplied from the video signal output device 20_1 (step S111).

The display device 10 updates the active device management table 121 to thereby write the information of "active device" into the column "status" relating to the video signal output device 20_1. In addition, the display device 10 writes the information of "inactive device" into the column "status" relating to the video signal output device 20_2 (step S112).

Accordingly, upon receiving the notification command C101 representing an output start sign from a different device (e.g. the video signal output device 20_1) than an active device (e.g. the video signal output device 20_2) configured to supply a video already displayed on screen, the display device 10 acquires the power status of the active device. When the power status of the active device is in an ON state, the display device 10 inhibits the process of the notification command C101 (i.e. the process for switching to a video signal of the video signal output device 20_1 as a video signal output to the display 150) until the power status of the active device is changed to an OFF state.

Figure 6:
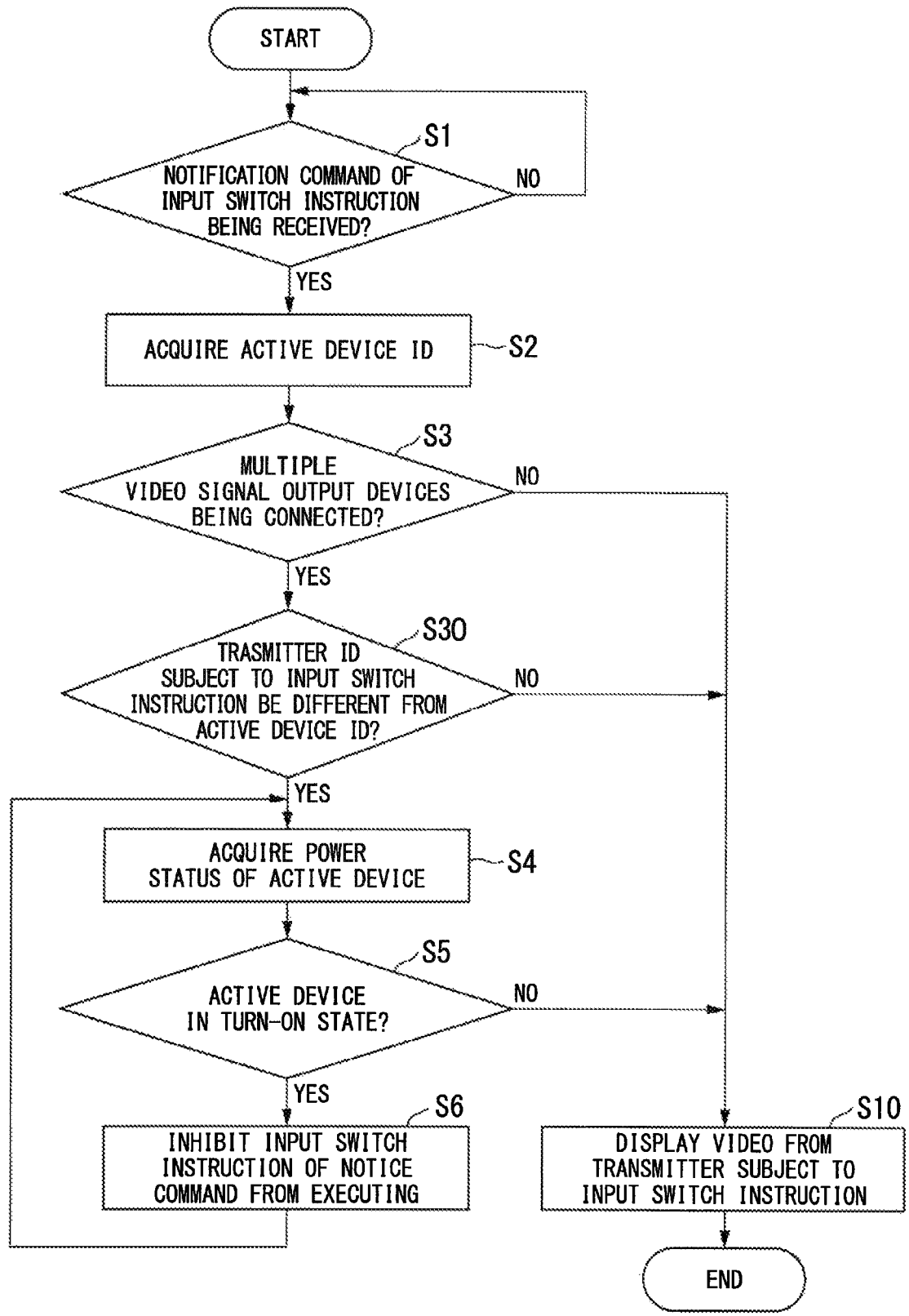
FIG. 6 is a flowchart showing a flow of processes implemented by the display device of FIG. 1.

Next, a flow of processes implemented by the display device 10 when holding a switching process of its input signal will be described with reference to FIG. 6. FIG. 6 is a flowchart for explaining the process of the display device 10.

First, the display device 10 receives the notification command C101, representing an input switch instruction due to an output start sign, from the video signal output device 20 connected to the display device 10 (step S1). The display device 10 refers to the active device management table 121 to thereby acquire the number of video signal output devices 20 connected to the display device 10, which is stored on the active device management table 121. The display device 10 determines whether or not the number of video signal output devices 20 connected to the display device 10, which is acquired from active device management table 121, is two or more (step S3).

When the number of video signal output devices 20 connected to the display device 10, which is acquired from the active device management table 121, is not two or more, the display device 10 refers to the active device management table 121 to thereby acquire the information registered in the column [device type] relating to the physical address [1.0.0.0] added to the notification command C101. The display device 10 displays a video corresponding to a video signal of the video signal output device 20 (i.e. the video signal output device 20_1) based on the information acquired from the active device management table 121 (step S10).

On the other hand, when the number of video signal output devices 20 connected to the display device 10, which is acquired from the active device management table 121, is two or more, the display device 10 refers to the active device management table 121 to thereby acquire the physical address [2.0.0.0] relating to the information of "active device" registered in the column "status" on the active device management table 121. The display device 10 compares the physical address [1.0.0.0] added to the notification command C101 with the physical address [2.0.0.0] acquired from the active device management table 121 (step S30).

When two physical address match each other, the display device 10 displays a video corresponding to a video signal of the video signal output device 20_1 indicated by the physical address [1.0.0.0] added to the notification command C101 (step S10).

On the other hand, when two physical addresses differ from each other, the display device 10 transmits the notification command C102 representing the power status acquire sign to the video signal output device 20_2 relating to the physical address [2.0.0.0] serving as an active device. Subsequently, the display device 10 receives from the video signal output device 20_2 the notification command C103 used to notify a power status as a response to the notification command C102 (step S4). The display device 10 determines whether or not the power status of the video signal output device 20_2 is a power-off state based on the notification command C103 (step S5).

When the power status of the video signal output device 20_2 is a power-off state, the display device 10 displays a video corresponding to a video signal supplied from the video signal output device 20_1 configured to transmit the notification command C101 (step S10).

On the other hand, when the power status of the video signal output device 20_2 is a power-on state, the display device 10 refers to the active device management table 121 to thereby register the information of "semiactive device" in the column representative of the status of the video signal output device 20_1. Thereafter, the display device 10 returns to step S4 (step S6).

Second Embodiment

Next, the second embodiment will be described with reference to FIG. 7.

Figure 7:
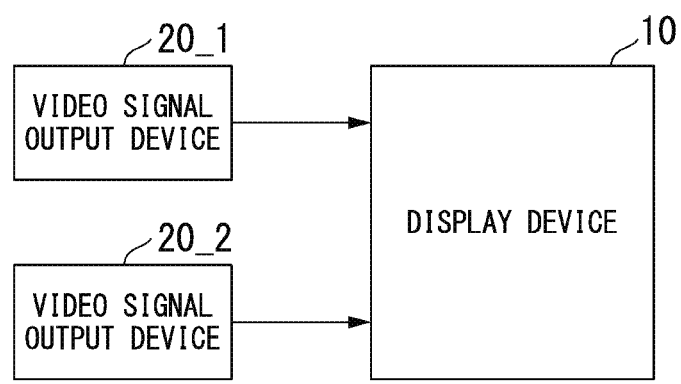
FIG. 7 is a block diagram for explaining a display device according to the second embodiment.

FIG. 7 is a functional block diagram showing a configuration example of the display system 1 including a display device according to the second embodiment. As shown in FIG. 7, the display system 1 includes the display device 10, and the video signal output devices 20_1, 20_2.

The display device 10 is designed to display a video corresponding to a video signal supplied from the video signal output device 20. Upon receiving an input switch instruction from the video signal output device 20_1, the display device 10 inhibits a video corresponding to a video signal from the video signal output device 20_1 from being displayed on screen while displaying a video corresponding to a video signal supplied from the video signal output device 20_2.

According to the first and second embodiments described above, upon activating the video signal output device 20_1, the controller 110 determines the ON/OFF state of power of the video signal output device 20_2 configured to output a video signal corresponding to a video signal currently displayed on screen. Then, the controller 110 carries out a process for inhibiting a video corresponding to a video signal of the video signal output device 20_1 from being displayed on screen until power is turned off with the video signal output device 20_2, and therefore it is possible to inhibit the video signal output device 20_2, which outputs a video signal corresponding to a video currently displayed on screen, from being arbitrarily switched to another device.

To determine an ON/OFF state of the power applied to the video signal output device 20_2 which outputs a video signal corresponding to a video periodically displayed on screen, the controller 110 is configured to immediately display a video corresponding to a video signal of the video signal output device 20_1 being activated when the power is turned off with the video signal output device 20_2.

According to the first and second embodiments described above, the controller 110 determines whether or not a video of the video signal output device 20_2 is currently displayed on screen by acquiring a power status of the video signal output device 20_2; but this is not a restriction. Upon acquiring a playback status of the video signal output device 20_2 indicating that its video is being played back, the controller 110 may temporarily hold a process for switching a video corresponding to a video signal of the video signal output device 20_2 to a video of the video signal output device 20_1. Upon acquiring a playback status of the video signal output device 20_2 indicating that playback of its video is being suspended, the controller 110 may carry out a process for switching a video corresponding to a video signal of the video signal output device 20_2 to a video of the video signal output device 20_1. That is, the controller 110 inhibits a video of the video signal output device 20_1 from being displayed on screen when the video signal output device 20_2 does not output a video signal or until playback of a video of the video signal output device 20_2 becomes suspended.

REFERENCE SIGNS LIST 1 display system
10 display device
100 input part
110 controller
101_1, 101_2 input port
102_1, 102_2 command transceiver
112 command analyzer
113 input switch controller
114 input switch
150 display
20_1, 20_2 video signal output device

The invention claimed is:

1. A display device connectible to a first video signal output device and a second video signal output device, the display device comprising:
a display; and
a controller,
wherein, upon receiving an input switch instruction from the first video signal output device, the controller is configured to inhibit displaying a first video from the first video signal output device while displaying a second video from the second video signal output device on the display,
wherein, when a power status of the second video signal output device indicates an inactive state, the controller is configured to display the first video from the first video signal output device, and
wherein the display device temporarily holds to accept the input switch instruction output from the first video signal output device to inhibit displaying the first video from the first video signal output device while displaying a second video from the second video signal output device on the display.

2. The display device according to claim 1, wherein the controller determines that the second video signal output device is set to the inactive state when no power is applied to the second video signal output device, when the second video signal output device does not output the second video, or when the second video signal output device suspends playing back the second video.

3. The display device according to claim 1, wherein the controller is configured to periodically acquire an activation status of the second video signal output device.

4. The display device according to claim 1, wherein the first video signal output device and the second video signal output device are connected together via a HDMI (High Definition Multimedia Interface) cable.

5. A video display method of a display device connectible to a first video signal output device and a second video signal output device, the video display method comprising:
receiving an input switch instruction from the first video signal output device;
determining whether or not a second video from the second video signal output device is being displayed on a display;
inhibiting displaying a first video from the first video signal output device while displaying the second video from the second video signal output device; and
displaying the first video from the first video signal output device when a power status of the second video signal output device indicates an inactive state,
wherein the display device temporarily holds to accept the input switch instruction output from the first video signal output device to inhibit displaying the first video from the first video signal output device while displaying a second video from the second video signal output device on the display.

6. The display device according to claim 1, wherein the controller determines that the second video signal output device is set to the inactive state when no power is applied to the second video signal output device.

7. The display device according to claim 1, wherein the controller determines that the second video signal output device is set to the inactive state when the second video signal output device does not output the second video.

8. The display device according to claim 1, wherein the controller determines that the second video signal output device is set to the inactive state when the second video signal output device suspends playing back the second video.

9. The display device according to claim 1, wherein the display device is configured to control a one-touch display function ascribed to a High Definition Multimedia Interface (HDMI).

10. A display device connectible to a first video signal output device and a second video signal output device, the display device comprising:
a display; and
a controller,
wherein, upon receiving an input switch instruction from the first video signal output device, the controller is configured to inhibit displaying a first video from the first video signal output device while displaying a second video from the second video signal output device on the display,
wherein, when a power status of the second video signal output device indicates an inactive state, the controller is configured to display the first video from the first video signal output device, and
wherein the controller changes videos using a command notification between the display device, the first video signal output device, and the second video signal output device with reference to a management table for managing the power status of each of the first video signal output device and the second video signal output device.

11. A video display method of a display device connectible to a first video signal output device and a second video signal output device, the video display method comprising:
- receiving an input switch instruction from the first video signal output device;
- determining whether or not a second video from the second video signal output device is being displayed;
- inhibiting displaying first video from the first video signal output device while displaying the second video from the second video signal output device; and
- displaying the first video from the first video signal output device when a power status of the second video signal output device indicates an inactive state,
- wherein videos are changed using a command notification between the display device, the first video signal output device, and the second video signal output device with reference to a management table for managing the power status of each of the first video signal output device and the second video signal output device.

12. The video display method according to claim 5, wherein the display device is configured to control a one-touch display function ascribed to a High Definition Multimedia Interface (HDMI).

13. The video display method according to claim 5, wherein an activation status of the second video signal output device is periodically acquired.

14. The video display method according to claim 5, wherein the second video signal output device is set to the inactive state when no power is applied to the second video signal output device.

15. The video display method according to claim 5, wherein the second video signal output device is set to the inactive state when the second video signal output device does not output the second video.

16. The video display method according to claim 5, wherein the second video signal output device is set to the inactive state when the second video signal output device suspends playing back the second video.

* * * * *